United States Patent
Nieto

(10) Patent No.: US 7,526,022 B2
(45) Date of Patent: Apr. 28, 2009

(54) LOW COMPLEXITY EQUALIZER

(75) Inventor: John Wesley Nieto, Rochester, NY (US)

(73) Assignee: Harris Corporation, Melbourne, FL (US)

( * ) Notice: Subject to any disclaimer, the term of this patent is extended or adjusted under 35 U.S.C. 154(b) by 594 days.

(21) Appl. No.: 10/848,415

(22) Filed: May 19, 2004

(65) Prior Publication Data
US 2005/0259728 A1    Nov. 24, 2005

(51) Int. Cl.
*H03H 7/30* (2006.01)
(52) U.S. Cl. .................. 375/233; 375/229; 375/230; 375/232
(58) Field of Classification Search .......... 375/229, 375/233, 348, 346, 232, 230
See application file for complete search history.

(56) References Cited

U.S. PATENT DOCUMENTS

| | | | |
|---|---|---|---|
| 4,365,338 A | 12/1982 | McRae et al. | |
| 5,175,745 A | 12/1992 | Kaku et al. | |
| 5,231,648 A | 7/1993 | Driedger et al. | |
| 5,291,519 A | 3/1994 | Tsurumaru | |
| 5,825,832 A | 10/1998 | Benedetto | |
| 5,946,351 A | 8/1999 | Ariyavisitakul et al. | |
| 6,012,161 A * | 1/2000 | Ariyavisitakul et al. | 714/795 |
| 6,094,408 A | 7/2000 | Verboom | |
| 6,100,835 A | 8/2000 | Hamilton | |
| 6,115,419 A * | 9/2000 | Meehan | 375/233 |
| 6,327,302 B1 * | 12/2001 | Shen | 375/232 |
| 6,570,918 B1 | 5/2003 | Rademacher | |
| 6,650,702 B1 * | 11/2003 | Steele | 375/233 |
| 6,754,294 B1 * | 6/2004 | Adireddy et al. | 375/348 |
| 6,950,477 B2 * | 9/2005 | Meehan et al. | 375/267 |
| 7,031,383 B2 * | 4/2006 | Shanbhag et al. | 375/233 |
| 7,123,653 B2 * | 10/2006 | Kim et al. | 375/232 |
| 7,130,366 B2 * | 10/2006 | Phanse et al. | 375/350 |
| 7,142,595 B1 * | 11/2006 | Duvaut et al. | 375/232 |
| 7,151,796 B2 * | 12/2006 | Allpress et al. | 375/229 |
| 7,170,931 B2 * | 1/2007 | Greiss et al. | 375/232 |
| 7,180,942 B2 * | 2/2007 | Chung et al. | 375/233 |
| 2005/0018794 A1 * | 1/2005 | Tang et al. | 375/341 |

* cited by examiner

*Primary Examiner*—Shuwang Liu
*Assistant Examiner*—Kenneth Lam
(74) *Attorney, Agent, or Firm*—Duane Morris LLP

(57) ABSTRACT

A low complexity equalizer and its architecture are disclosed. The low complexity equalizer can identify and remove intersymbol interference caused by digital filters, analog filters, communication channel, channel-filtering and matched-channel filtering of the original transmitted signal.

11 Claims, 6 Drawing Sheets

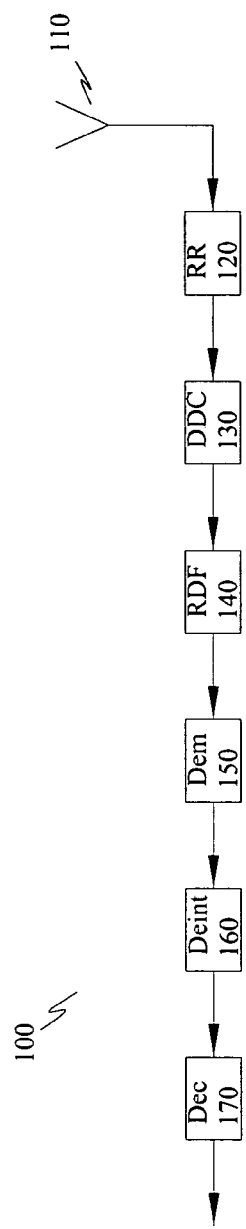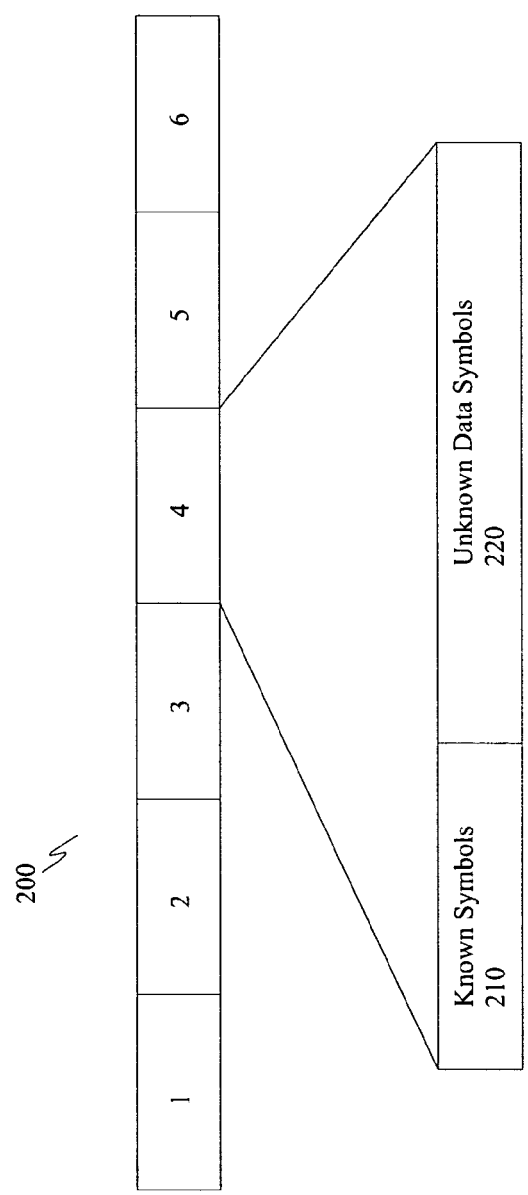

LOW COMPLEXITY EQUALIZER

FIELD OF THE INVENTION

The invention disclosed herein generally relates to methods and apparatus for identifying and removing interference in radio transmission systems. More specifically, the invention relates to apparatus and method for tracking and adaptively combating intersymbol interference.

BACKGROUND

Radio communication channels such as HF, VHF and UHF introduce distortion in the form of multipath, fading and other types of interference into the originally transmitted signal. Transmission distortion can be caused by, for example, multipath reception of the original signal, group delay distortion, noise amplitude distortion, interference and fading. A symptom of these distortions is intersymbol interference. Intersymbol interference occurs if modulation bandwidth exceeds the coherent bandwidth of the radio channel, which in turn causes the modulation pulses to spread in time to adjacent symbols. Intersymbol interference can also be caused by the radio channel exhibiting time and frequency dispersion (e.g., delay spread and Doppler spread) due to the presence of signal reflectors/scatterers in the environment or the relative motion of transmitter and receiver.

Intersymbol interference causes bit errors at the receiver which distorts the intended message content. To address transmission channel distortion adaptive equalizers or recursive filters have been included in the receivers. FIG. 1 schematically illustrates signal processing steps of a conventional receiver. Referring to FIG. 1, receiver 100 includes an antenna 110 for receiving the signal; radio receiver filter 120 for limiting the bandwidth of the incoming signal (typically to 3 KHz for an HF signal); digital down-conversion 130 for converting signal from 1800 Hz carrier to baseband (for an HF signal); digital low pass filter 140; demodulator 150 (with one or more equalizer); deinterleaver 160 and decoder 170 for forward error correction. The block interleaver typically has several different user selectable lengths to allow selection of proper block size for current channel conditions.

Adaptive equalizers are widely used in demodulator 150 because of their ability to continually change their equalization characteristics (filter coefficients) in response to the time-varying nature of the channel distortion. A commonly used equalizer is a decision feedback equalize ("DFE"). The principle of operation of a DFE is that once an information symbol has been detected and decided upon, the amount of intersymbol interference caused by this symbol can be estimated and removed while the subsequent symbols are being processed.

FIG. 3 is a schematic representation of a conventional DFE. Referring to FIG. 3, equalizer 300 is shown to have both a feedforward filter ("FFF") and a feedback filter ("FBF"). The FBF is driven by the output of the detector 340 and each of the coefficients 350 is adjusted to cancel intersymbol interference on the current symbol from the previously-detected symbols. Equalizer 300 has N filter taps in the FFF and three taps in the FBF. Shift registers are conventionally used as delay elements 315 and 345, and the delay period is typically equivalent to a symbol period $T_s$. Tap weights 320 for the FFF and tap weights 350 for the FBF can be determined based on known algorithms such as zero forcing ("ZF"), the least means squares ("LMS"), the recursive least squares ("RLS"), Minimum Mean Square Error Criterion, to name a few.

The DFE 300 filter coefficients can be computed based on the estimate of the channel. The operation of the adaptive equalizer may include training and tracking. During the training process, the transmitter sends a fixed-length training sequence (or the "known symbols") which is known apriori by the receiver. This is done so that the receiver's equalizer can continually adapt in order to minimize the bit error rate ("BER") and to acquire initial filter coefficients even in the worst possible channel conditions. Once training is completed, the filter coefficients are near their optimal values and ready to receive the actual message (herein referred to as the "unknown data symbols").

A DFE can operate in one of two ways. In one mode (the so-called data-directed mode) decisions being made can be used to adapt filter coefficients. Alternatively, the known data symbols can be used to compute channel estimates and interpolated channel estimates. These estimates are then used to compute the filter coefficients of DFE using known algorithms. An advantage of the second approach is that it removes the added errors caused by potentially erroneous decisions of the DFE.

FIG. 2 is a schematic representation of a radio message signal. Each frame 200 typically consists of 6 slots, with each slot containing both the known sequence block 210 (the training symbols) and the unknown sequence block 220 (the data symbols). The training sequence of the North American digital cellular standard contains 14 known symbols for a total of 28 bits. The unknown data block can include 256 symbols (but can be longer or shorter). The choice of how many known symbols to include in waveform is driven by the multipath requirements of waveform. The repetition rate of known symbols (i.e., how far apart or how long unknown data block) is determined by maximum fading (Doppler spread) requirements of waveform.

Even with the application of the most advanced equalizers, demodulating a signal in a multipath and fading environment can be particularly challenging. Most equalizers have some residual intersymbol interference that is ignored since it is considered negligible. As a constellation increases in complexity, the effects of this residual ISI can no longer be ignored and must be addressed. Without accounting for the residual ISI, the equalizer output becomes inaccurate and maybe even useless.

Moreover, for best performance, the received signal must be channel-filtered and channel-matched filtered before it is sent to the equalizer. When the received signal is channel-matched filtered, the channel is spread to both the present and the future symbols (As used herein, future symbols are symbols which are sent later in time relative to current symbol time position.) In other words, additional intersymbol interference is spread to both the known and the unknown data symbols. The conventional equalizers disregard some of this added intersymbol interference. Thus, there is a need for a novel equalizer that accounts for this residual ISI.

An object of the invention is to provide an equalizer architecture to overcome multipath and/or fading caused by the communication channel.

Another object of the invention is to provide a low complexity equalizer adapted to account for the intersymbol interference caused by the channel, the channel-matched filtering, the radio filtering and all other signal filtering operations.

Still another object of the invention is to provide a filtering device to address HF, VHF and UHF propagation bands.

BRIEF DESCRIPTION OF THE DRAWINGS

These and other objectives will be accomplished by simultaneous reference to the following non-limiting drawings where:

FIG. 1 schematically illustrates signal processing steps at a conventional receiver;

FIG. 2 is a schematic representation of a radio message signal;

DETAILED DESCRIPTION OF THE INVENTION

When a transmitted signal is subject to digital filters, analog filters, a multipath/fading channel, a matched filter and a channel-matched filter, the channel intersymbol interference is spread to both the present and future symbols. To compensate for the additional interference and in accordance with an embodiment of the invention, a DFE is devised as having feedforward and feedback filters as well as a feedfuture transversal filter ("FFTF"). By adding a FFTF, the equalizer can compensate for intersymbol interference which is disregarded by the conventional DFE.

Figure 3:
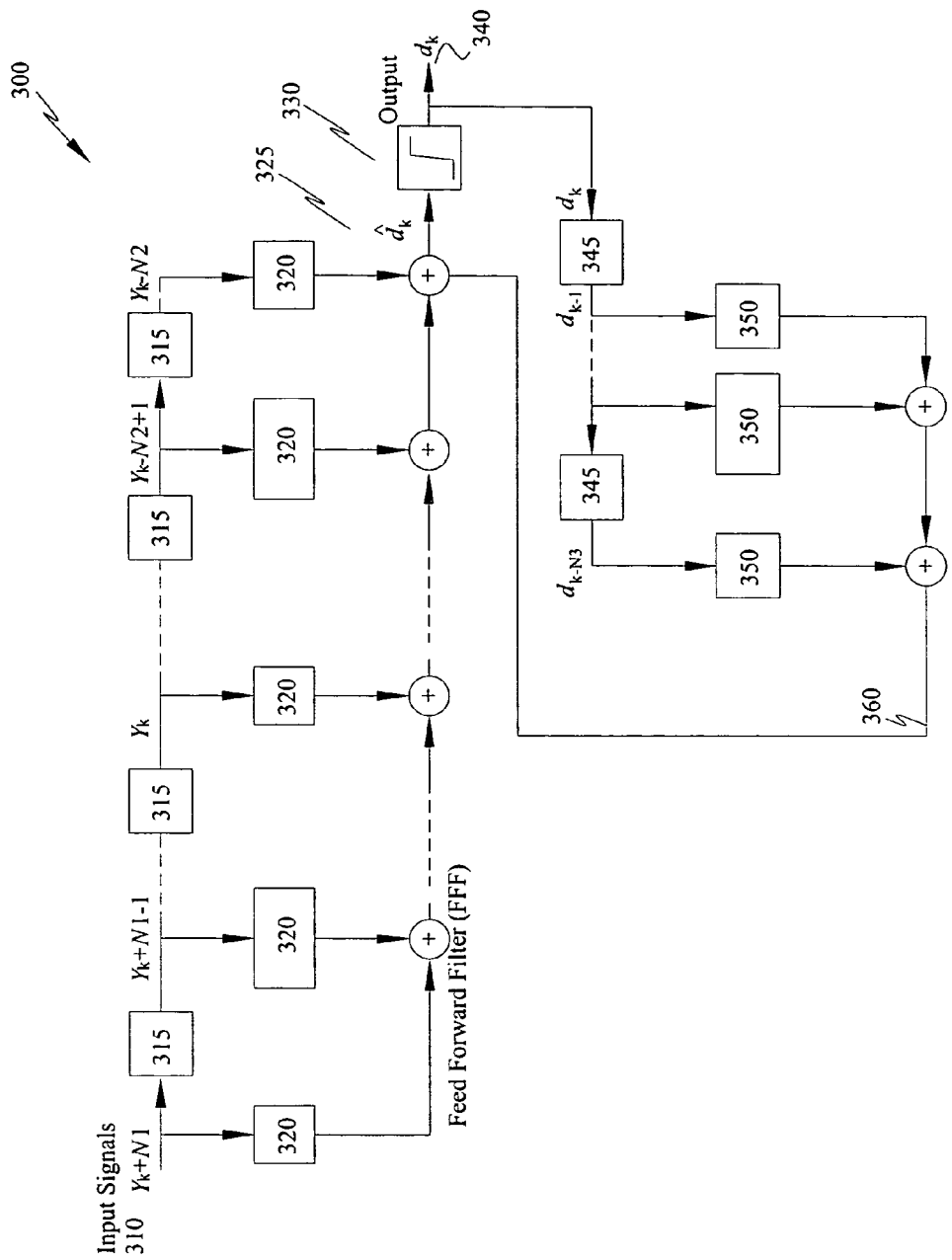
FIG. 3 is a conventional decision feedback equalizer.
Figure 4:
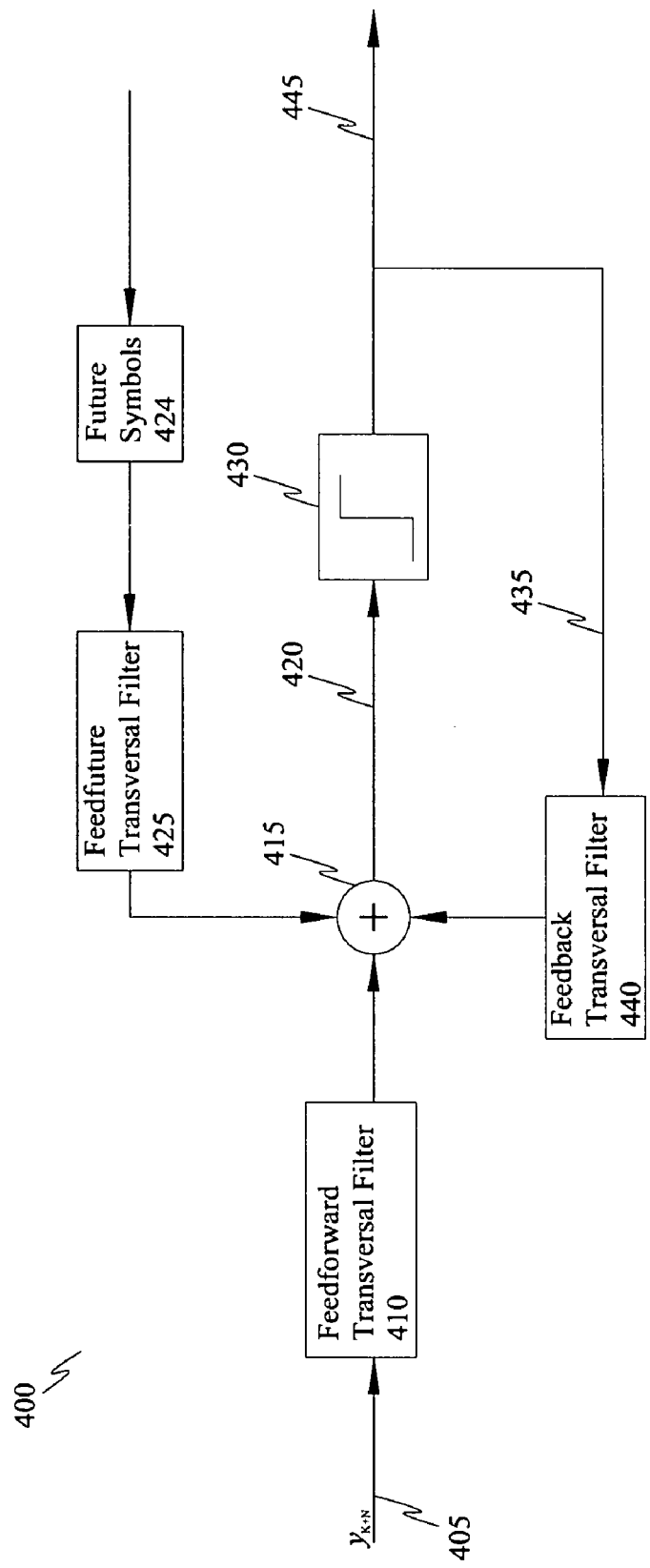
FIG. 4 is a schematic representation of an equalizer according to an embodiment of the invention.

FIG. 4 is a schematic drawing of an equalizer according to an embodiment of the invention. Referring to FIG. 4, equalizer 400 receives incoming signal 405. The incoming signal can be a complex baseband signal that has been matched-filtered and channel-matched filtered. Consequently, the incoming signal can contain intersymbol interference induced by the communication channel as well as intersymbol interference induced by the upstream signal processing devices.

Signal 405 is directed to a FFF 410, the adder 415, symbol decision device 430 and FBF 440. The output signal 420 is a first symbol estimate. Symbol estimate 420 is processed through symbol decision device 430 which clamps the incoming symbols to their closest constellation point. Any of the known algorithms can be used for this purpose (e.g., if using 8 PSK modulation, minimum distance can be determined by vector analysis). The output of the symbol decision device 430 is the closest modulation symbol 435, which represents the closest value to the symbol's intended value. It should be noted that both the symbol estimate 420 and the closest modulation symbols 435 can be real or complex numbers depending on the symbol modulation.

To compensate for intersymbol interference addressed above, Feedfuture transversal filter ("FFTF") 425 is added to the equalizer 400. The input to the FFTF 425 is the future symbol estimates 424 which contains both known and unknown symbols (see FIG. 2). The output of the FFTF 425 is directed to adder 415. It has been found that the iterative block processing by FFF 410, FBF 440 and FFTF 425 can substantially reduce intersymbol interference from incoming signal 405.

Figure 5:
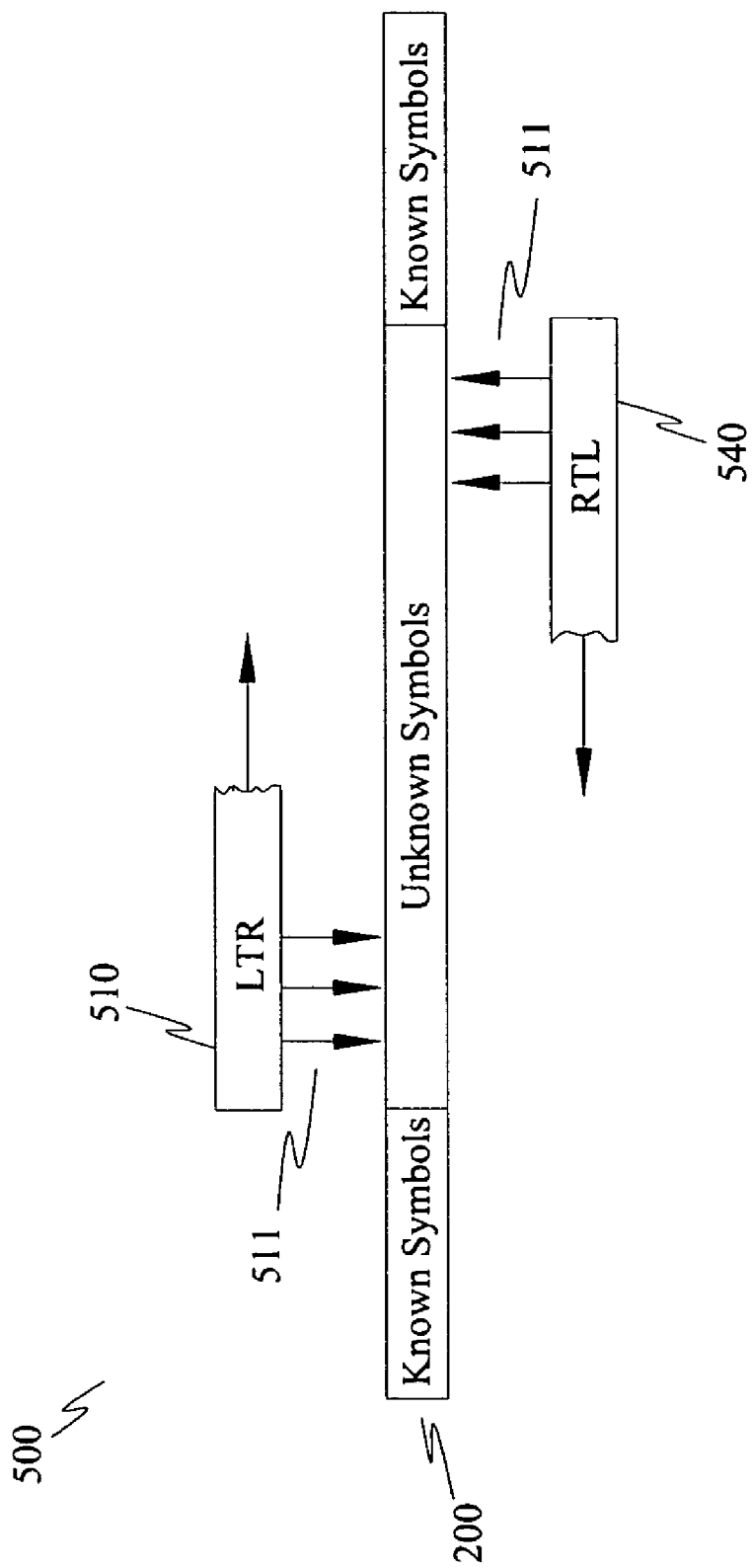
FIG. 5 is a novel equalizer architecture for a feedfuture transversal filter.

FIG. 5 is a novel equalizer architecture for a FFTF. The FFTF can be integrated with a DFE as shown in FIG. 4, or as a standalone unit. With reference to FIG. 5, the FFTF 500 is shown to have equalizers 510 and 540. Equalizer 510 operates on a block of data from left to right ("LTR") and the equalizer 540 operates on the block of data from right to left ("RTL"). The unknown (future) symbols are initially set to zero for iteration zero. Then the two equalizers process the unknown data block in parallel, providing a first estimate of the unknown symbol values as their output (i.e., symbol estimates clamped to the closest constellation point).

The two equalizers can run symbol-by-symbol or can run in blocks of an array of symbols at one time. For example, if the equalizer taps were recomputed at a duration of once every M symbols (if for example channel estimates are interpolated to generate different channel estimates across the unknown block), then each equalizer can decipher M symbols at a time before changing the filter coefficients of equalizer. It should be noted that even under this method of operation the process can still run symbol by symbol, changing filter coefficients of equalizer every M symbols. Once the entire block of the unknown data is completed, the symbol estimates (future symbols) of both equalizers are added together and normalized to obtain an average of the future symbol estimates at each iteration (however, other combining strategies could be used as well). This array is then clamped to the closest constellation point and becomes the new future symbol array for the next iteration. The iteration process can be repeated a number of times to improve quality of the estimates. In one embodiment, up to fifteen iterations are implemented.

The unknown (future) symbol array 220 can be updated a number of times. In a preferred embodiment, the unknown symbol array is updated two to three times. Arrows 511 schematically represent the step of replacing the unknown clamped symbol estimate with an estimated value which is determined by the LTR and RTL equalizers. Each equalizer continuously inserts estimated values until the entire segment of unknown data symbols is replaced. Since the equalizers are operating in the opposite direction to each other, at some point they will overlap. For example, the LTR equalizer will read unknown data symbols from left-to-right and insert estimated symbol values in their place. At some point in this process, the LTR equalizer will read data symbols which have already been processed by the RTL equalizer. Once the overlap occurs, the LTR can use the latest clamped symbol estimates computed by RTL (and vice versa). It is believed that this overlap enhances the accuracy of symbol estimates, especially during the first pass.

Although the exemplary embodiment of FIG. 5 shows a FFTF having two equalizers, it is understood that the invention is not limited thereto. Indeed, the number of equalizers can be increased or decreased and the processing order (LTR, RTL) can be modified without exceeding the principles of the invention.

Referring once again to FIG. 5, the incoming data 500 is similar to that described in relation to FIG. 2 (i.e., as having both known symbols and unknown data symbols). In the embodiment of FIG. 5, two equalizers 510 and 530, run data in opposite directions, that is, left-to-right ("LTR") and right-to-left ("RTL"), respectively. The number of equalizer taps may vary. In one embodiment, each equalizer is devised with fifteen taps. The tap weights can be estimated using conventional algorithms such as Zero Forcing or the MMSE algorithm. As with the FFF and FBF, channel estimates can provide a basis for tap weight for LTR and RTL equalizers.

The output estimates of the LTR and RTL equalizers are combined with the output estimate of the feedfuture and feedback filters as shown in FIG. 4. The symbol estimating process can be repeated iteratively to improve the accuracy of the estimates.

Figure 6:
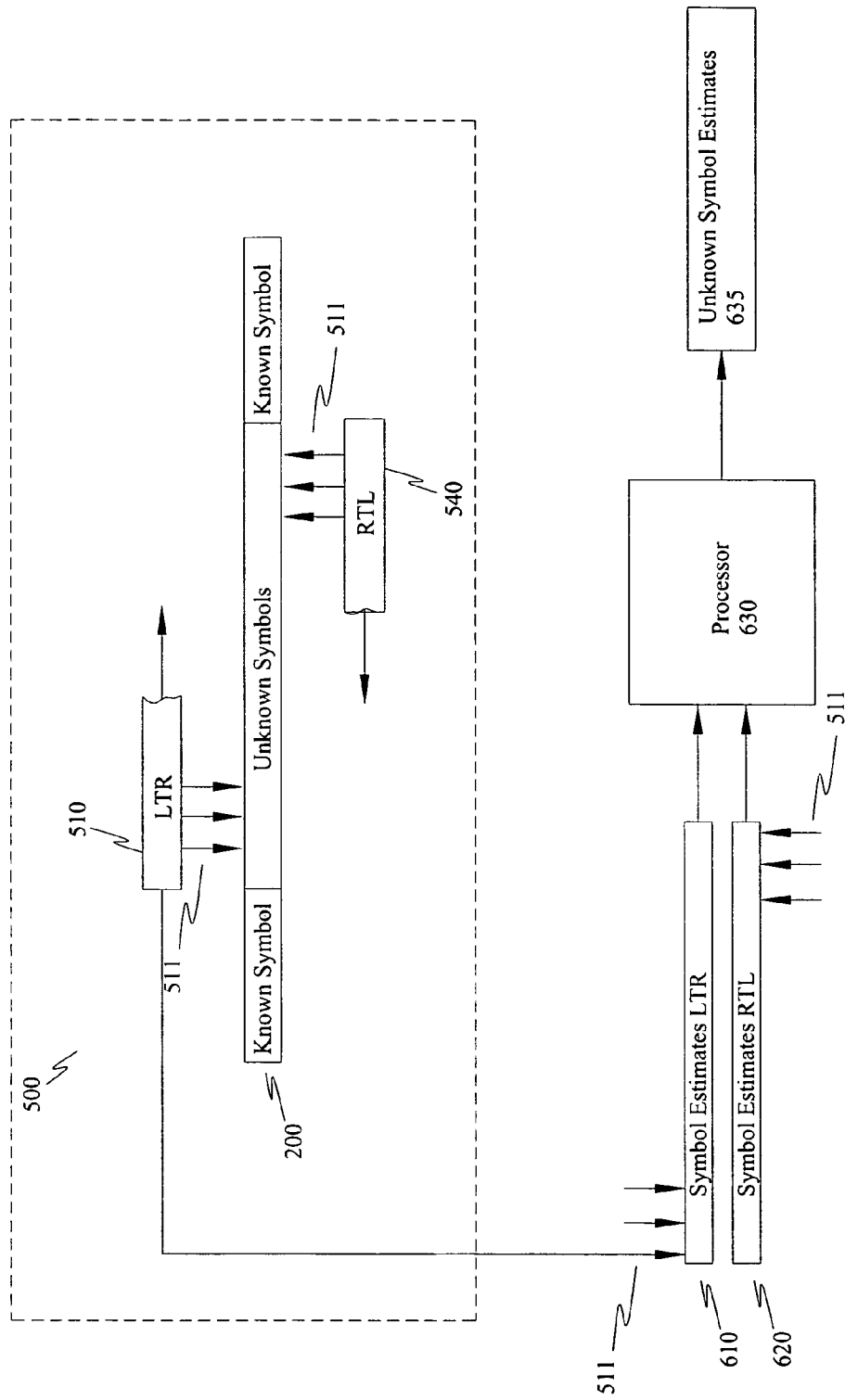
FIG. 6 shows of processing steps of an exemplary feedfuture transversal filter.

FIG. 6 is a schematic representation of processing steps of a feedfuture transversal filter according to an embodiment of the invention. Estimates from each of the two equalizers 510 and 540, respectively (shown in FIG. 5) is provided as symbol estimates 610 and 620. These symbols estimates are collected as described in relation to FIG. 5. At the end of each iteration, symbol estimates 610 and 620 can be added together, normalized and clamped to the closest constellation point by processor 630 to form the new unknown symbol estimates 635. This estimate can be used as a basis for the future iterations. For example, unknown symbol estimates 635 can be transmitted to adder 415 (FIG. 4) and/or sent to a separate soft decision device (not shown) for further processing.

Combining a FFTF equalizer of FIG. 6 with the FFF and FBF, as shown in FIG. 4, enables detection and removal of intersymbol interference caused by digital filtering, analog filtering, channel filtering and channel-matched filtering. Moreover, the equalizer architecture shown in FIG. 6 can be integrated as part of a transversal filter or used as a stand-alone device capable of communicating with other components of a receiver. Thus, in one embodiment, the invention includes a low complexity equalizer for addressing intersymbol interference caused by all channel impairments such as filtering, communication channel, matched filtering and channel-matched filtering of the original transmitted signal. The low complexity equalizer can be a combination of several equalizers forming a feedfuture filter. In another embodiment, the equalizer can include an integrated combination of feedforward and feedback filters with a feedfuture filter.

A simulation of the equalizer was implemented to evaluate the performance of the FFTF against a Block Equalizer. A simulated waveform having the following characteristics was transmitted:

Mini-probe=31 symbols
Unknown data block=256 symbols
Unknown data block modulation=16-QAM
Convolutional Coding=rate ¾ code (rate ½ code punctured to ¾)
Block interleaver length=150 frames
NE2 stands for 2 iterative updates of future symbols; NE3 stands for three updates.
BE stands for a Block Equalizer. Compared to the DFE's unacceptable performance, the BE provides an acceptable performance but can have a very high computational complexity.

Figure 7:
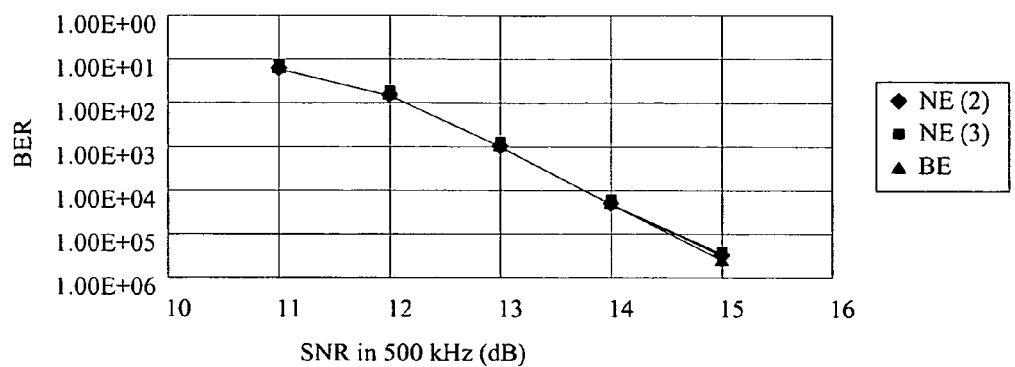
FIG. 7 is a performance comparison of equalizers on a white Gaussian noise.

FIG. 7 is a performance comparison of equalizers on a white Gaussian noise ("AWGN") channel. As expected the performance difference is insubstantial between the BE and NE with 2 or 3 iterations (BE, NE2 and NE3) since the AWGN channel does not require an equalizer.

Figure 8:
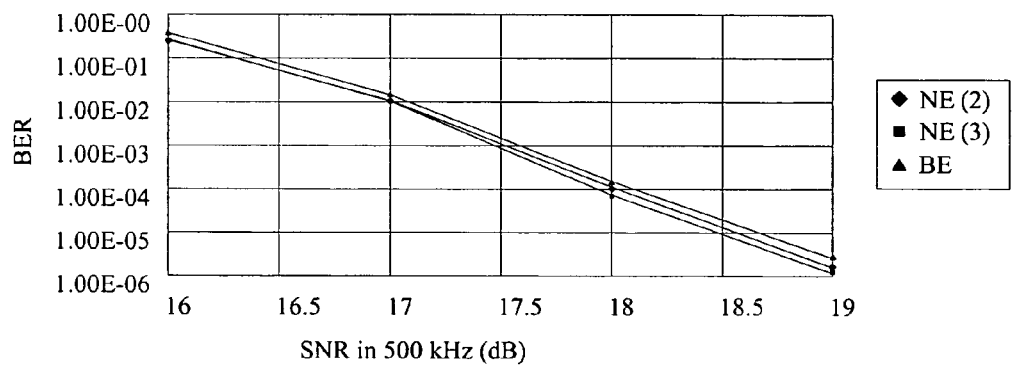
FIG. 8 is the multipath performance of exemplary equalizers and a Block equalizer which outperforms DFE but is computationally very complex.

FIG. 8 is the multipath performance of exemplary equalizers and a conventional equalizer. Here, both paths have equal power, there was no fading and the delay between the two paths was about 2.5 symbols. As can be seen from FIG. 8, the performance of the NE is slightly better than the BE. Also, FIG. 8 shows that the FFTF equalizer with three iterations performed comparatively better than the FFTF equalizer with only two iterations.

What is claimed is:

1. In a decision feedback equalizer receiving an input signal which has been digitally filtered and/or analog filtered, subject to a communication channel, and match-filtered and/or channel-matched filtered, the equalizer having a feedforward filter providing a first signal on a first path to an adder and a feedback filter providing a second signal on a second path to said adder, said filters processing an array of known data symbols and an array of unknown data symbols and providing a channel estimate based on the known data symbols, the improvement comprising a feedfuture transversal filter for reducing intersymbol interference, said feedfuture filter providing a third signal on a third path to said adder, wherein said first, second and third signals are iteratively added by said adder to produce an array of symbols substantially free of intersymbol interference, and wherein said feedfuture transversal filter includes one or more equalizers for receiving the array of known data symbols and the array of unknown data symbols and respectively providing an output of symbol estimates, a processor for receiving and combining the respective symbol estimates of said one or more equalizers to output a closest symbol estimate, said one or more equalizers providing an output of symbol estimates interdependent with the output of the other filters.

2. The decision feedback equalizer of claim 1, wherein the feedfuture transversal filter further comprises at least two equalizers adapted to receive the array of unknown data symbols and provide an estimated value for the unknown data symbols.

3. The decision feedback equalizer of claim 2, wherein the feedfuture filter further comprises a processor for receiving the value estimate from each of the equalizers.

4. The decision feedback equalizer of claim 2, wherein each of the value estimates from the equalizers is combined, normalized and clamped to the closest constellation point to form an estimated array of the unknown data symbols.

5. The decision feedback equalizer of claim 4, wherein the estimated array of the unknown data symbols is processed as an input to the feedfuture transversal filter for several iterations.

6. A method for reducing intersymbol interference in an array of modulated data symbols comprising the steps of:
    a) receiving an incoming array of symbols including a block of known symbols and a block of unknown symbols;
    b) processing the incoming array of symbols through a first transversal filter to obtain a first output on a first path, the first output repeating the block of known symbols and an estimate of the previously unknown symbols;
    c) processing the first output through a second transversal filter and a feedfuture transversal filter to obtain a second output on a second path and a third output on a third path, respectively; and
    d) adding each of the first, second and the third outputs and iteratively repeating steps a, b and c to produce an output array of symbols substantially free of intersymbol interference,
    wherein said feedfuture transversal filter includes one or more equalizers for receiving the array of known and unknown symbols and respectively providing an output of symbol estimates, a processor for receiving and combining the respective symbol estimates of said one or more equalizers to output a closest symbol estimate, said one or more equalizers providing an output of symbol estimates interdependent with the output of the other filters.

7. The method of claim 6, wherein the first filter is a feedforward transversal filter.

8. The method of claim 6, wherein the second filter is a feedback transversal filter.

9. The method of claim 6, wherein the second filter is coupled to a symbol decision device for assessing an incoming symbol to its closest estimated value.

10. The method of claim 6, further comprising the steps of estimating a value of the unknown block of data by each of the equalizers, the estimating occurring in parallel with the other equalizer and producing an output for each of the two equalizers.

11. The method of claim 10, further comprising the steps of receiving each of the two outputs, and combining and clamping the outputs to the closest constellation point.

* * * * *